No. 639,967. Patented Dec. 26, 1899.
A. A. FREEMAN & O. ARMSTRONG.
LUBRICATOR.
(Application filed Nov. 15, 1898.)

(No Model.)

Witnesses:
Thomas M. Smith.
Richard C. Maxwell.

Inventors:
Albert A. Freeman and Ogden Armstrong
By J. Walter Douglass
Attorney.

THE NORRIS PETERS CO., PHOTO-LITHO., WASHINGTON, D. C.

UNITED STATES PATENT OFFICE.

ALBERT A. FREEMAN AND OGDEN ARMSTRONG, OF PHILADELPHIA, PENNSYLVANIA, ASSIGNORS TO THE AUTOMATIC LUBRICATOR COMPANY, OF SAME PLACE AND WHEELING, WEST VIRGINIA.

LUBRICATOR.

SPECIFICATION forming part of Letters Patent No. 639,967, dated December 26, 1899.

Application filed November 15, 1898. Serial No. 696,508. (No model.)

*To all whom it may concern:*

Be it known that we, ALBERT A. FREEMAN and OGDEN ARMSTRONG, citizens of the United States, residing at the city of Philadelphia, in the county of Philadelphia and State of Pennsylvania, have invented certain new and useful Improvements in Automatic Sight-Feed Lubricators, of which the following is a specification.

Our invention has relation to a lubricator having a sight-feed and in which the oil or lubricant delivered to the reservoir of the lubricator is automatically discharged therefrom, and in such connection our invention relates particularly to certain hereinafter-defined means connected with the lubricant-reservoir of the device for introducing into the reservoir the oil or lubricant and to certain other defined means for cutting off absolutely discharge of the oil or lubricant from said reservoir when the movable or vibrating part of the machine to which the lubricator is attached is at rest.

The principal objects of our invention are, first, to provide an automatic sight-feed lubricator of simple construction and arrangement whereby the several parts may be readily assembled and taken apart for required purposes, and, second, to provide a lubricator of the character described with a lubricant-reservoir having a spring-controlled valve for opening and closing the exit of said reservoir, the spring whereof is detachably connected with a spindle having a hollow stem, into which the lubricant is admitted and flows therethrough into the reservoir, and a bayonet connection between the reservoir and stem so arranged as to permit of the raising and lowering of the valve-spring stem and spindle with its hollow stem.

Our invention, stated in general terms, consists of an automatic sight-feed lubricator when constructed and arranged in substantially the manner hereinafter described and claimed.

The nature and characteristic features of our invention will be more fully understood from the following description, taken in connection with the accompanying drawings, forming part hereof, in which—

Figure 1:
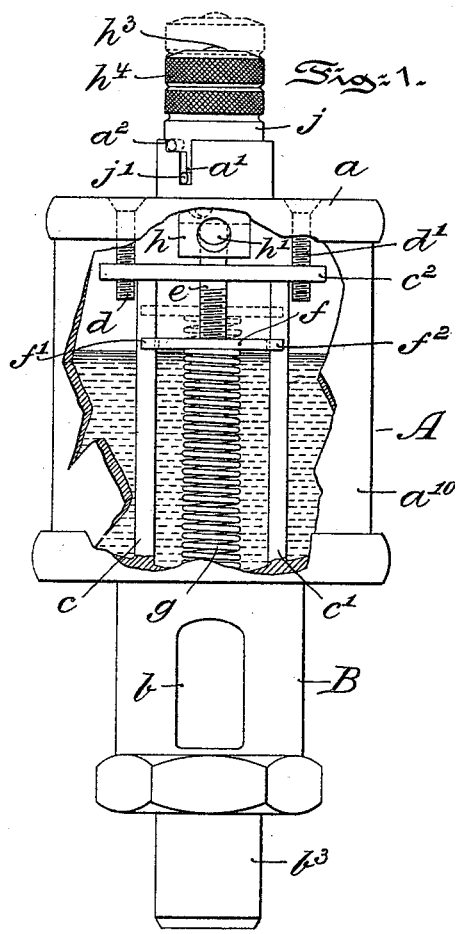
Figure 3:
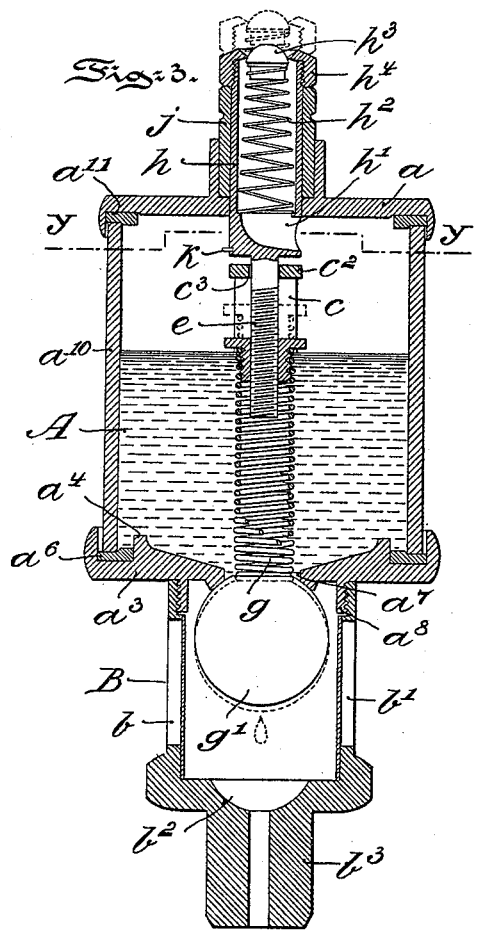
Figure 2:
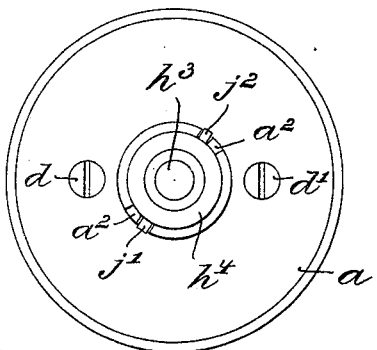
Figure 4:
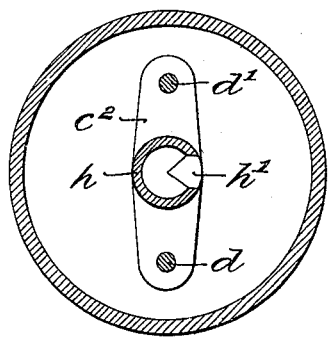

Figure 1 is a view, partly in broken section and partly in elevation, of a sight-feed lubricator device embodying the main features of our invention. Fig. 2 is a top or plan view of the device of Fig. 1. Fig. 3 is a vertical sectional view of the lubricator, showing the detail construction of our invention; and Fig. 4 is a transverse section on the line $y\,y$ of Fig. 3.

Referring to the drawings, A represents the lubricant-reservoir of the device, provided, as illustrated, with a downwardly-flanged top plate $a$, having on the inner side, adjacent to the periphery of the same, a cork, rubber, or other suitable type of gasket $a^{11}$, and integral with the exterior of said plate is formed a throat or neck having step-like notches $a'$ and $a^2$ arranged opposite to each other for a purpose to be presently fully described.

$a^3$ is an upwardly-flanged bottom plate provided on the inner side with a rim $a^4$, between which and the flange of said plate $a^3$ is removably mounted a cork, rubber, or other suitable type of gasket $a^6$. Inside of the rim $a^4$ of the bottom plate $a^3$ the surface of the plate is made sloping to a central orifice or opening $a^7$, and on the under side of said plate $a^3$ about the said orifice or opening is provided a threaded collar or rim $a^8$ for removably securing thereto a cylindriform-chambered device B, provided with oblong openings $b$ and $b'$ in the wall thereof on opposite surfaces of the same and with an internal inclined bottom $b^2$, connected with a nipple $b^3$, having a reduced discharge-orifice or passage-way through which the oil or other suitable lubricant is adapted to escape from the device. In the inclined surface, on the inner side of the bottom plate $a^3$ and preferably formed integral therewith, are two standards $c$ and $c'$, with a cross-strip $c^2$ perforated adjacent to the respective ends of the same for the insertion of screw-bolts $d$ and $d'$ therethrough and with a central opening $c^3$, through which a spindle or shank $e$, partially threaded, is afforded a range of movement. This spindle or shank at its lower end is adapted to be engaged in a spanning strip $f$, having recessed ends $f'$ and $f^2$ slidable in connection with the two standards $c$ and $c'$ of the bottom plate $a^3$ of the lubricator. This plate carries one end of a helical, spiral, or coiled spring $g$, the other end of which spring is secured into a ball $g'$, adapted to close the beveled or other suitable type of seat about the outlet orifice or opening in the bottom plate $a^3$ of the oil or lubricant reservoir A. The upper end of the spindle or shank $e$ is provided with a hollow stem $h$, with an outlet-opening $h'$. In this hollow stem $h$ is mounted a helical or other type of spring $h^2$, with a button, ball, or stud-pin $h^3$ adapted to fit up into an opening in the beveled surface of a removable cap $h^4$, secured onto the hollow stem $h$. By depressing the button, ball, or stud-pin the oil is permitted to flow through the stem and from the outlet $h'$ thereof into the lubricant-reservoir A, provided with a glass or other surrounding wall located and held between the top and bottom plates $a$ and $a^3$ in the manner illustrated in Figs. 1 and 3 of the drawings.

Mounted on the upper portion of the hollow stem $h$ in normal position is a sleeve $j$, provided with projecting pins $j'$ and $j^2$ opposite each other. This sleeve is mounted in the throat or neck of the top plate $a$ of the device. Projecting from the lower portion of the hollow stem $h$ within the lubricant-reservoir A is a pin $k$, provided therein so as to prevent displacement of said stem in its operative position in connection with the central opening of the top plate $a$ of the lubricant-reservoir, as clearly illustrated and as will be readily understood from Figs. 1 and 2 of the drawings.

The mode of operation of the device hereinbefore described is as follows: Oil or other lubricant by depressing the stud or button $h^3$ is admitted into the hollow stem $h$ of the device and escapes therefrom into the interior of the lubricant-reservoir A, and with the parts of the lubricator in the position as illustrated in either Fig. 1 or 3 the oil will flow around the ball $g$, seated in the bottom plate $a^3$, in minute particles or drops in a downward direction through the contracted orifice of the nipple in the sight-feed chamber and be discharged through said orifice onto the part or parts of machinery to be kept oiled. This action of the valve will continue and supply the oil in regulated quantity automatically onto the part of machinery to be lubricated while the machine or engine is in motion, or if during the time the machine is in action any of the parts thereof should become unduly lubricated the supply of fluid can be cut off by raising the hollow stem, and therewith the spring and its spindle, by a manual operation to cause the pins of the sleeve, which latter surrounds said stem, to engage with the step-like slots in the throat or neck of the top plate $a$ of the lubricant-reservoir A, and thereby to draw the ball-valve so tightly against its seat in the bottom plate $a^3$ of the reservoir A as to absolutely prevent any escape of oil from the reservoir A, and while in this position the tension under which the spring of said ball-valve $g$ is held can be regulated by simply turning the cap at the upper end of the hollow stem $h$. In case the ball should feed too freely while the machinery is in action, by turning the cap at the upper end of the hollow stem $h$ the spring may be brought under greater tension, to thereby reduce the discharge of oil around about the ball $g$ and its seat into the sight-chamber B beneath the same and prior to its discharge through the contracted passage-way of the nipple $b^3$, formed integral with said chamber B. By means of the tightening-screws extending through the top plate $a$ and engaging with the cross-strip $c^2$, formed integral with the vertical standards $c$ and $c'$, the top and bottom plates $a$ and $a^3$, in conjunction with the surrounding glass wall $a^{10}$, are held firmly in position, so as to constitute by the clamping of these parts together in the manner explained the lubricant-reservoir A of the device.

It will be observed that in case of any trouble with the lubricator the various parts can be readily separated, and equally true is it that parts of the device can be readily assembled for use again. Moreover, by reason of the feed being made from the interior through the top of the lubricator dust and other extraneous matter are removed from contact with the oil-reservoir, and thereby an efficient lubricator provided which is automatic in action and under perfect control as to the quantity of oil or other lubricant discharged therefrom and with the tension of the balancing-spring of the valve controlled without disorganizing the device.

Having thus described the nature and objects of our invention, what we claim as new, and desire to secure by Letters Patent, is—

1. An automatic sight-feed lubricator provided with a lubricant-reservoir, a spring-controlled valve for opening and closing the exit of said reservoir, the spring whereof is detachably connected with a threaded spindle carrying a hollow stem into which hollow stem the lubricant is admitted and flows therethrough into said reservoir, and a bayonet connection between said reservoir and stem so arranged as to permit of the raising and lowering of said valve-spring stem and spindle with its hollow stem, substantially as and for the purposes described.

2. An automatic sight-feed lubricator provided with a lubricant-reservoir, a spring-controlled ball-valve for opening and closing the exit of said reservoir, the spring whereof is detachably connected with a threaded spindle carrying an adjustable stem into which the lubricant is admitted and from which it flows into said reservoir, and a bayonet connection for raising and lowering said stem and controlling the spring tension of the ball of said valve, substantially as and for the purposes described.

3. An automatic sight-feed lubricator provided with a lubricant-reservoir, a ball-valve for opening and closing the exit of said reservoir having a spring-stem connected with a nut in which is mounted an adjustable spindle carrying a hollow stem, the latter closed at the upper end by a button held under spring tension and a bayonet connection between said valve-stem and lubricator-reservoir for raising and lowering said hollow stem with its spindle and therewith increasing or decreasing the tension of the spring-stem of said ball-valve, substantially as and for the purposes described.

4. An automatic sight-feed lubricator provided with a detachable oil-reservoir, a sight-feed chamber connected with said reservoir having a nipple with a contracted orifice, a spring-controlled valve normally seated in the outlet of said reservoir, a hollow stem connected with the spring of said valve, a spring-controlled button, ball or stud-pin mounted in said stem and normally closing the inlet of the same, and a bayonet connection between said lubricator-reservoir and stem, substantially as and for the purposes described.

5. An automatic sight-feed lubricator provided with an oil-reservoir, consisting of top and bottom plates and an intermediate wall, said parts being clamped and held together, the bottom plate of said reservoir on the inner side inclined and having standards and a cross-strip, means for clamping the top plate to the cross-strip of said standards, a spring-controlled valve fitting the outlet of said reservoir and carrying a spanning device connected with a spindle and a hollow stem, the latter adapted to permit of oil being admitted thereinto and of flowing through the same into said reservoir, and a spring-actuated button, ball or stud-pin mounted in said hollow stem and normally closing the oil-inlet thereof, substantially as and for the purposes described.

In testimony whereof we have hereunto set our signatures in the presence of two subscribing witnesses.

ALBERT A. FREEMAN.
    OGDEN ARMSTRONG.

Witnesses:
 J. WALTER DOUGLASS,
 THOMAS M. SMITH.